United States Patent [19]

Kidd

[11] Patent Number: 5,173,237

[45] Date of Patent: Dec. 22, 1992

[54] METHOD OF MAKING A METALLIC CORE ASSEMBLY

[75] Inventor: Thomas F. Kidd, Candiac, Canada

[73] Assignee: Electrovert Ltd., Ontario, Canada

[21] Appl. No.: 469,164

[22] Filed: Jan. 24, 1990

[51] Int. Cl.[5] ........................ B29C 33/34; B29C 33/52

[52] U.S. Cl. ..................................... 264/221; 264/317; 264/37; 164/120; 164/136; 249/62

[58] Field of Search .......................... 264/221, 317, 37; 164/120, 36; 425/DIG. 201; 249/62, 64

*Primary Examiner*—Jay H. Woo
*Assistant Examiner*—Jeremiah F. Durkin, II
*Attorney, Agent, or Firm*—Darby & Darby

[57] ABSTRACT

A multiple metallic core assembly for use in production of a plastic injection-molded component is formed by injecting molten metal alloy into a core die at a fill stage of an indexing system, indexing the core die through a cooling stage to an unloading stage, and removing the core from the core die and inserting the core in one of a plurality of locations of the core assembly. Individual cores are continued to be formed as discussed above until all the locations of the core assembly are filled, and the core assembly is complete. Therefore, the core assembly is removed and transported to a plastic molding machine to produce the plastic component. Then, the core assembly is melted out from the plastic component in hot oil, and the molten metal alloy produced thereby is returned to a molten metal alloy tank.

3 Claims, 2 Drawing Sheets

METHOD OF MAKING A METALLIC CORE ASSEMBLY

TECHNICAL FIELD

The present invention relates to melt-out metal cores for molded plastic components. More specifically the present invention relates to forming multiple metallic cores into a core assembly for a plastic injection molded component.

BACKGROUND ART

Melt-out metal parts of complex shapes are made for use as cores in subsequent molded plastic components. Melt-out metal parts are also used for encapsulating components such as turbine blades so they may be held for machining and other finishing steps. On many applications using melt-out cores and encapsulations it is necessary to engineer the required internal geometry of the finished plastic component by using a plurality of metallic cores which are preassembled prior to loading the multiple core assembly into the plastic injection mold of a plastic molding machine. It has been necessary in the past to manually assemble each core into a multiple core assembly and this is both time consuming and costly.

AIMS OF INVENTION

It is an aim of the present invention to provide an automatic method and apparatus for producing individual melt-out cores and assembling the metallic cores into a complete core assembly which can then be automatically fed to a plastic injection molding machine. By providing an automatic assembly system, the savings in both man power and time is apparent, and furthermore greater accuracy of the core assembly is obtained.

DISCLOSURE OF INVENTION

The present invention provides a metallic core injection arrangement such as that shown in our corresponding U.S. application Ser. No. 268,492 filed Nov. 8, 1988 now U.S. Pat. No. 4,958,675. In this application, melt-out metal cores and the like are made of metal alloys with low melting temperatures and the cores have a high quality finish and a fine grain structure. The cores also have high dimensional accuracy, such being necessary to assemble multi parts within an envelope also requiring high accuracy. A number of dies are provided so that they may be indexed from a loading position to an unloading position, passing through a cooling stage, and then the individual cores are unloaded by a dedicated robotic system that inserts the cores into fixtures, one or two at a time, to provide a complete core assembly. The core assembly is then transported to the plastic molding machine for the plastic mold to be formed.

After the plastic mold has been formed it is placed in an oil melt-out tank which has an oil temperature above the melting temperature of the metallic cores but below the melting temperature of the plastic parts. The metallic material then melts and falls to the bottom of the tank where it is conveyed to a liquid metallic tank for further use in producing more individual cores.

The present invention provides a method of forming multiple metallic cores into a core assembly for a plastic injecting molded component, comprising the steps of a) injecting molten metal alloy into at least one core die at a fill stage of an indexing means, b) indexing the die through a cooling stage to an unloading stage, c) removing the core from the die by robotic handling means and inserting the core into one of a plurality of locations in a core assembly, d) repeating steps a to c until the plurality of locations are filled and the core assembly is complete, and e) removing the complete core assembly for transportation to a plastic molding machine.

BRIEF DESCRIPTION OF DRAWINGS

The present invention further provides an apparatus for automatically forming metallic cores into a core assembly for a plastic injection molded component, comprising metallic core injection means for injecting molten metal at low pressure, a plurality of core dies on an indexing means, wherein one die is positioned for injection of molten metal from the metallic core injection means, at least one die is positioned for cooling the metal core, and at least one die is positioned for unloading the metal core, core die indexing means for moving core dies from an injection position through at least one cooling position to an unloading position, robotic handling means to remove the metal core from the unloading position and insert the core into one of a plurality of locations in a core assembly, core assembly indexing means to position the core assembly so that each of the plurality of locations has a core inserted therein, and robotic removal means to remove a complete core assembly for transportation to a plastic injection molding machine.

In drawings which illustrate embodiments of the invention.

BEST MODE OF CARRYING OUT INVENTION

Figure 1:
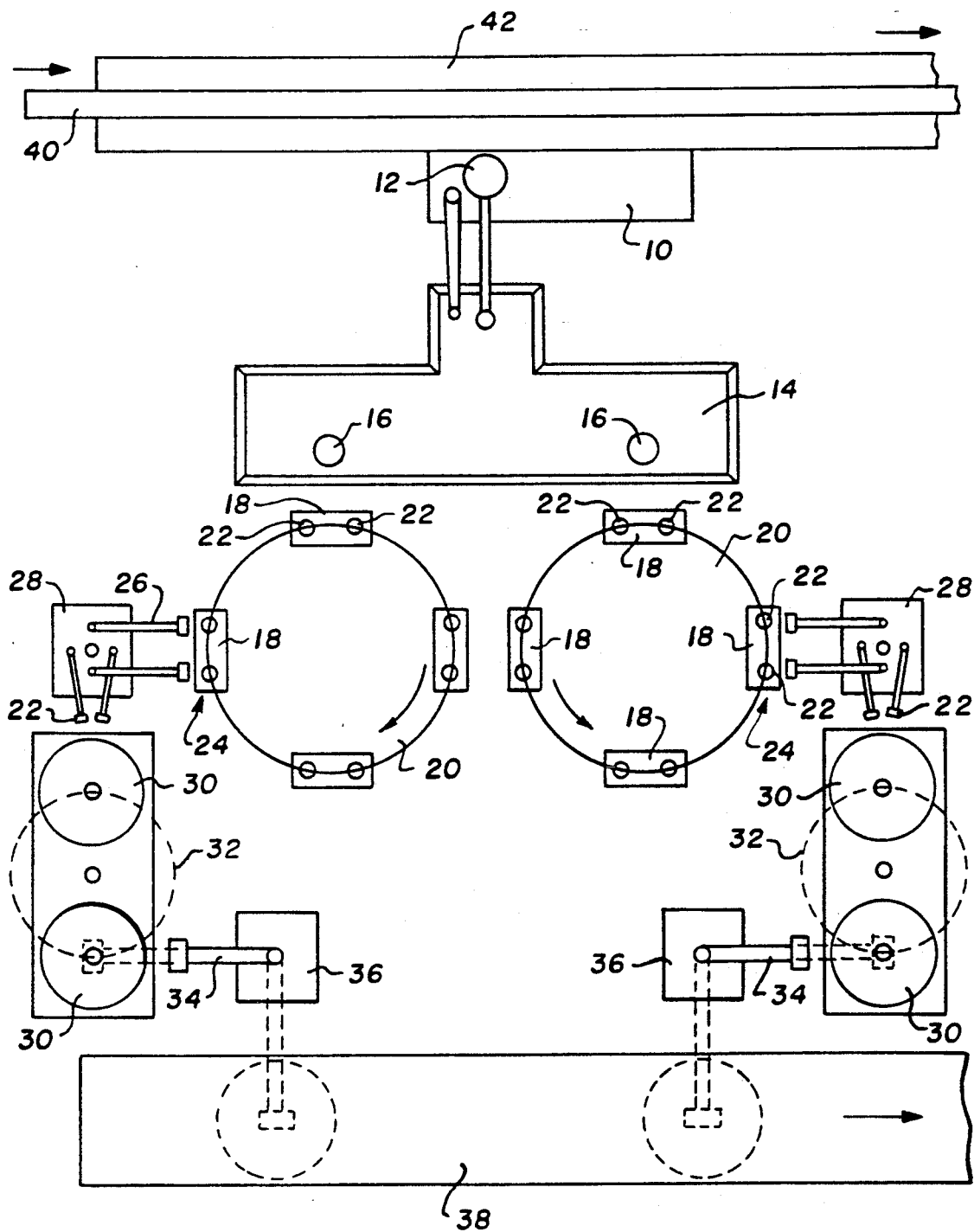
FIG. 1 is a schematic plan view showing one embodiment of an apparatus for automatically forming metallic cores into a core assembly.
Figure 2:
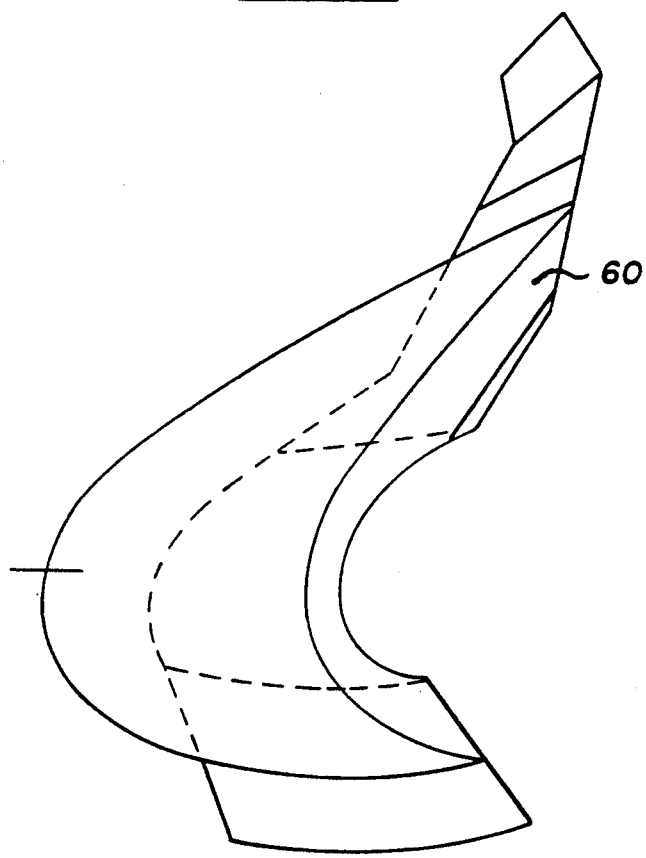
FIG. 2 is the front view of a turbine segment encapsulated with a melt-out piece.
Figure 3:
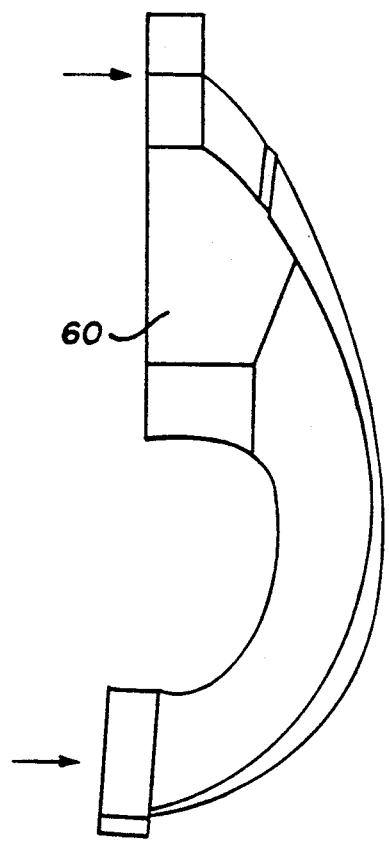
FIG. 3 is a side view of the turbine segment shown in FIG. 2.

Referring now to FIG. 1, a liquid metal tank 10 is shown to contain a molten metal alloy used for melt-out metallic cores. A piston and cylinder 12 within the tank 10 is designed to force metal alloy through a dispensing arrangement 14 through two nozzle outlets 16 both of which are connected to dies 18 positioned on a rotating indexing table 20. Each die 18 is arranged to produce two cores 22. After injection of the cores 22, the table 20 indexes the dies 18 to a first cooling position and empty dies 18 are rotated to the injection position. There are two assembly lines fed from the dispenser 14 and the rotating tables 20 index the dies 18 through two cooling positions to an outlet position 24. There are a total of four set of dies 18 arranged around the rotating table 20. Whereas four are shown here it will be obvious to those skilled in the art that more or less may be provided as required.

When in the unloading position 24, two robot arms 26 are arranged at predetermined distance apart to advance, pickup the two cores 22 from the dies 18, bring them back from the dies and the robot 28 rotates through 90°, the two arms 26 pivot inwards so the two cores 22 are positioned exactly the correct distance apart, the arms 20 then advance and insert the cores 22 directly into a fixture 30 to retain them. The fixture 30 forms part of the core assembly. In some embodiments, the fixture 30 is a separate piece which is placed in position prior to insertion of the cores 22. In another embodiment the cores 22 are formed to lock together so that when the core assembly is complete it holds together as a unit. Each core assembly 30 is mounted on an indexing table 32 and as shown in the drawings at least two core assemblies are mounted on the indexing table 32. The core assembly 30 is rotated in the loading position, after each insertion of two cores 22 by the robot arms 26. When the fixture 30 is full or complete, then it is indexed to the unloading position on the indexing table 32, and a second robot arm 34 picks up the completed core assembly 30 and the robot 36 rotates to drop the core assembly 30 on a conveyor 38.

The complete core assembly 30 is then conveyed to a plastic injection molding machine (not shown) placed in the die of the molding machine and the injection molding made. After cooling the plastic molding is placed on a conveyor 40 as shown in the top of FIG. 1 and past through a hot oil tank 42 which has a temperature higher than the melting temperature of the metal but below the melting temperature of the plastic. The metal cores melt and molten metal drops to the bottom of the tank 42. There is a connection at the bottom of the tank 42 so the molten metal is then transferred to the molten metal tank 10 for reuse. This permits continuous production of cores ready for assembly.

In one embodiment the molten metal injection dispenser 14 produces a continuous production cycle of four cores 22 every fifteen seconds. There are twenty-three cores 22 that fit in each core assembly 30 and it is arranged that on the twelfth injection of molten metal into the dies 18, only one core 22 is filled, thus the twenty-third core is positioned on its own into the core assembly 30.

The core 22 in one embodiment is a segment of a turbine rotor. Twenty-three segments of the rotor are assembled in a fixture and when the complete core assembly is loaded into the die in the plastic injection molding machine, the space between each core segment is filled with plastic to provide a complex three dimensional aerofoil shape. Such a complex shape is only possible to be molded in one piece by means of the melt-out system.

In the embodiment shown, with two injection stations form four cores at each injection stroke. A cycle time of fifteen seconds produces sixteen cores per minute which results in a core assembly containing twenty-three cores being assembled in 1.44 minutes.

Various changes may be made to the embodiments shown herein without departing from the scope of the present invention which is limited only by the following claims.

The embodiments of the present invention in which an exclusive property or privilege is claimed are defined as follows:

1. A method of forming multiple metallic cores into a core assembly for use in production of a plastic injection-molded component, said method comprising the steps of:
    a) providing a tank containing molten metal alloy,
    b) injecting molten metal alloy supplied from the molten metal tank into at least one core die located at a fill stage of an indexing means,
    c) indexing the core die through a cooling stage to an unloading stage,
    d) removing a core formed in the core die therefrom by robotic handling means and inserting the core into one of a plurality of locations in the core assembly,
    e) continuing forming individual cores as set forth in steps b-d until all locations of the plurality of locations are filled, and the core assembly is complete,
    f) removing the complete core assembly and transporting the core assembly to a plastic molding machine to produce the plastic component, and
    g) melting the core assembly out from the produced plastic component in hot oil and returning the molten alloy produced thereby to the molten metal alloy-containing tank.

2. A method according to claim 1 wherein the core assembly is rotated a predetermined angular displacement between each insertion of a core.

3. A method of forming multiple metallic cores into a core assembly for use in production of a plastic injection-molded component, said method comprising the steps of:
    a) providing a tank containing molten metal alloy,
    b) injecting molten metal alloy supplied from the molten metal tank into a core die located at a fill stage of an indexing means,
    c) indexing the core die through a cooling stage to an unloading stage,
    d) removing a core formed in the core die therefrom and inserting the core into one of a plurality of locations in the core assembly,
    e) continuing forming individual cores as set forth in steps b-d until all locations of the plurality of locations are filled, and the core assembly is complete,
    f) transporting the complete core assembly to a plastic molding machine to produce the plastic component, and
    g) melting the core assembly out from the produced plastic component in hot oil and returning the molten alloy produced thereby to the molten metal alloy-containing tank.

* * * * *